United States Patent [19]

Kojima et al.

[11] Patent Number: 4,646,327
[45] Date of Patent: Feb. 24, 1987

[54] WAVEFORM SHAPING APPARATUS

[75] Inventors: Yuichi Kojima, Tokyo; Etsumi Fujita, Kanagawa; Yasuhiro Hideshima, Saitama, all of Japan

[73] Assignee: Sony Corporation, Tokyo, Japan

[21] Appl. No.: 761,905

[22] Filed: Aug. 2, 1985

[30] Foreign Application Priority Data

Aug. 23, 1984 [JP] Japan .................................. 59-175702

[51] Int. Cl.⁴ .......................................... H04L 25/49
[52] U.S. Cl. ...................................... 375/60; 375/11; 364/724
[58] Field of Search .................... 375/11, 12, 14, 60; 333/18, 28 R; 364/724, 725

[56] References Cited

U.S. PATENT DOCUMENTS

| | | | |
|---|---|---|---|
| 3,631,232 | 12/1971 | Perreault | 375/11 |
| 4,003,002 | 1/1977 | Snijders et al. | 375/60 |
| 4,255,794 | 3/1981 | Nakayama | 364/724 |
| 4,267,761 | 5/1981 | Deutsch | 364/724 |
| 4,337,518 | 6/1982 | Ohnishi et al. | 364/724 |

Primary Examiner—Robert L. Griffin
Assistant Examiner—Stephen Chin
Attorney, Agent, or Firm—Lewis H. Eslinger; Alvin Sinderbrand

[57] ABSTRACT

A waveform shaping apparatus includes a shift register having a clock input terminal, data input terminals supplied with respective bits of a digital input signal and a plurality of data output terminals, and a plurality of coefficient multipliers connected to the respective data output terminals. A 2's-complement binary code offset within a predetermined range is used for representing the coefficient of each of the multipliers and such coefficient is controlled by manipulation of ON/OFF switches.

6 Claims, 15 Drawing Figures

| | | | |
|---|---|---|---|
| 3 | 0 | 1 | 1 |
| 2 | 0 | 1 | 0 |
| 1 | 0 | 0 | 1 |
| 0 | 0 | 0 | 0 |
| -1 | 1 | 1 | 1 |
| -2 | 1 | 1 | 0 |
| -3 | 1 | 0 | 1 |
| -4 | 1 | 0 | 0 |

FIG. 8

| Adding Binary | | | Natural Binary | | | 2's Complement | | |
|---|---|---|---|---|---|---|---|---|
| 1 | 0 | 1 (5) | 1 | 1 | 1 | 0 | 1 | 1 |
| 1 | 0 | 0 (4) | 1 | 1 | 0 | 0 | 1 | 0 |
| 0 | 1 | 1 (3) | 1 | 0 | 1 | 0 | 0 | 1 |
| 0 | 1 | 0 (2) | 1 | 0 | 0 | 0 | 0 | 0 |
| 0 | 0 | 1 (1) | 0 | 1 | 1 | 1 | 1 | 1 |
| 0 | 0 | 0 (0) | 0 | 1 | 0 | 1 | 1 | 0 |
| 1 | 1 | 1 (-1) | 0 | 0 | 1 | 1 | 0 | 1 |
| 1 | 1 | 0 (-2) | 0 | 0 | 0 | 1 | 0 | 0 |

$\Rightarrow$ +010 +110

FIG. 9

| Adding Binary | | | Natural Binary | | | 2's Complement | | |
|---|---|---|---|---|---|---|---|---|
| 1 | 1 | 0 (6) | 1 | 1 | 1 | 0 | 1 | 1 |
| 1 | 0 | 1 (5) | 1 | 1 | 0 | 0 | 1 | 0 |
| 1 | 0 | 0 (4) | 1 | 0 | 1 | 0 | 0 | 1 |
| 0 | 1 | 1 (3) | 1 | 0 | 0 | 0 | 0 | 0 |
| 0 | 1 | 0 (2) | 0 | 1 | 1 | 1 | 1 | 1 |
| 0 | 0 | 1 (1) | 0 | 1 | 0 | 1 | 1 | 0 |
| 0 | 0 | 0 (0) | 0 | 0 | 1 | 1 | 0 | 1 |
| 1 | 1 | 1 (-1) | 0 | 0 | 0 | 1 | 0 | 0 |

$\Rightarrow$ +001 −101

WAVEFORM SHAPING APPARATUS

BACKGROUND OF THE INVENTION

1. Field of the Invention

The present invention relates generally to a waveform shaping apparatus for waveform-shaping a digital signal in the form of a base-band and more particularly is directed to a waveform shaping apparatus having improved precision for correcting distortion.

2. Description of the Prior Art

It is known, in data transmission that, in order to minimize code error due to inter-symbol interference, the waveform has to be equalized, that is, a base-band signal has its waveform shaped such that on a first reference of Nyquest, or on a time axis of an impulse response waveform, the waveform will cross at zero points at equal intervals.

In order to increase the precision for correcting distortion, it is preferable to carry out the waveform shaping by a digital circuit. However, in the case of the prior art waveform shaping apparatus formed of a digital circuit, the result of addition carried out in the waveform shaping apparatus is displaced in the direction of one polarity so that the word length of the given data can not be utilized as effectively as possible. In other words, there is less than full utilization of the entire dynamic range.

OBJECTS AND SUMMARY OF THE INVENTION

Accordingly, it is an object of this invention to provide a waveform shaping apparatus which can achieve a desired dynamic range even when an added output is displaced in the direction of one polarity.

It is another object of this invention to provide a waveform shaping apparatus including coefficient multipliers using as the coefficients a code which results from offsetting of the 2's-complement binary code, and a code converter for returning the offset 2's-complement binary code to the normal or original 2's-complement binary code after the data weighted by the coefficient multiplied has been received from an adder.

In accordance with an embodiment of the invention, a waveform shaping apparatus is provided, which includes: a shift register having a clock input terminal, a data input terminal and a plurality of data output terminals; a plurality of coefficient multipliers each having respective input and output terminals, said input terminals of the coefficient multipliers being connected to respective data output terminals of said shift register with each coefficient being expressed in a 2's-complement binary code offset within a predetermined range; adder means supplied with output signals from the output terminals of said multipliers to produce a summing output; and a code converter receiving said summing output so as to convert the same into a natural binary code or a 2's-complement binary code.

The above, and other objects, features and advantages of the present invention, will become apparent from the following detailed description taken in conjunction with the accompanying drawings.

BRIEF DESCRIPTION OF THE DRAWINGS

FIG. 5 is a code table to which reference will be made in explaining the present invention;

FIGS. 7, 8 and 9 show respective code tables to which reference will be made in explaining the present invention.

DESCRIPTION OF A PREFERRED EMBODIMENT

Figure 1:
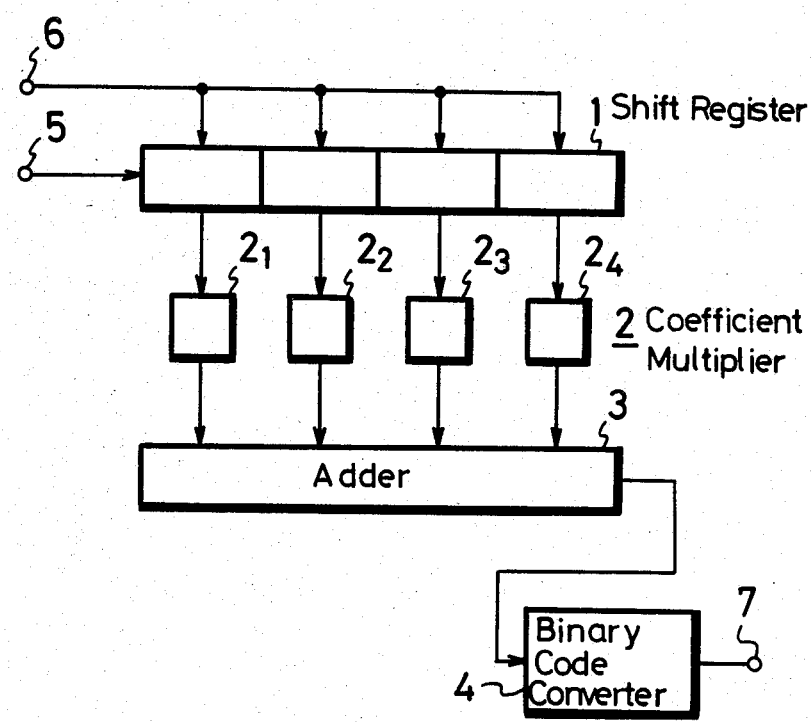
FIG. 1 is a circuit block diagram showing the fundamental construction of a waveform shaping apparatus according to an embodiment of the present invention.

A waveform shaping apparatus according to an embodiment of the present invention is shown on FIG. 1 to generally comprise a shift register 1 and a coefficient multiplier 2 consisting of elements $2_1$ to $2_4$ which are each formed of a coefficient generator and a multiplier and correspond in number to the respective bits of shift register 1. Coefficient multiplier 2 carries out either positive or negative weighting on an input data "1" supplied thereto from the shift register 1. The waveform shaping apparatus of FIG. 1 is further shown to comprise an adder 3 which carries out 2's-complement binary code addition with the binary code offset and then defined for the purpose of utilizing the given word length as effectively as possible, as will be described later. A binary code converter 4 is provided to convert the content or data from adder 3 to, for example, a natural binary code or 2's-complement binary code. Finally, in FIG. 1, there is shown a data input terminal 5 through which input data is supplied to shift register 1, a clock input terminal 6 through which a clock is supplied to shift register 1, and an output terminal 7 led out from binary code converter 4. In the embodiment being described, the clock applied to clock input terminal 6 has a data rate or frequency twice that at which the input data is applied to input terminal 5.

Figure 2:
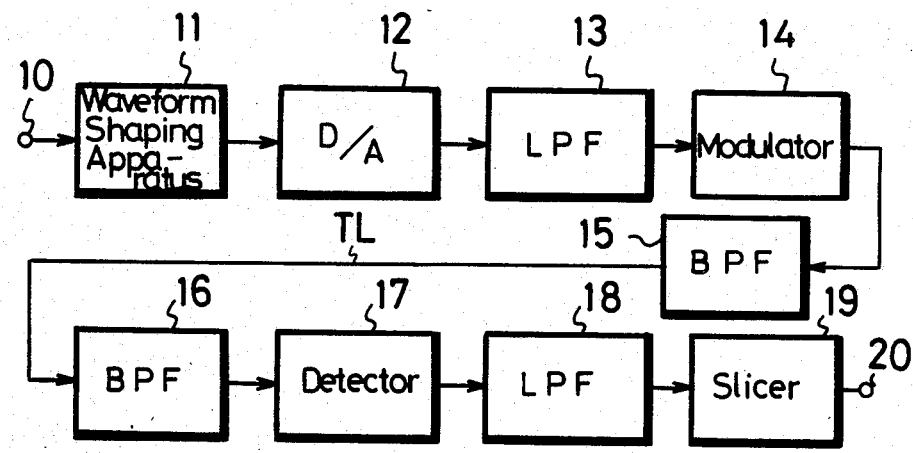
FIG. 2 is a circuit block diagram showing a data transmitting-receiving system in which the waveform shaping apparatus of FIG. 1 may be advantageously employed.

The waveform shaping apparatus of FIG. 1 is desirably used in, for example, a data transmitting-receiving system as shown in FIG. 2. Such data transmitting-receiving system is shown to have an input terminal 10 to which data from an information source is supplied, a waveform shaping apparatus 11, as shown in FIG. 1, connected between terminal 10 and a D/A converter 12 which supplies its output through a low-pass filter 13 to a modulator 14 (for example, an amplitude modulator), and a band-pass filter 15 through which the output of modulator 14, is applied to a transmission line TL. A band-pass filter 16 receives the transmitted signal from line TL, and a detector 17 (AM detector) is connected between band-pass filter 16 and a low-pass filter 18. A slicer 19 is connected to filter 18 for detecting or demodulating the digital signal, and an output terminal 20 is led out therefrom. In this case, the transmitting side of the system is formed of the circuit elements from the input terminal 10 to the band-pass filter 15, while the receiving side is formed of the circuit elements from the band-pass filter 16 to the output terminal 20. The transmitting side and the receiving side are connected to each other by way of the transmission line TL.

The waveform shaping apparatus 11 is operated to correct the distortion of each section of the base-band signal which is demodulated in the receiving side and developed at the output of low-pass filter 18, so that such base-band signal may satisfy the first reference of Nyquist and thereby minimize the code error produced by the inter-symbol interference.

Next, the way to carry out the coefficient weighting and addition of the coefficients in the circuit of FIG. 1 will be described with reference to FIGS. 3A to 3F.

Figure 3A:
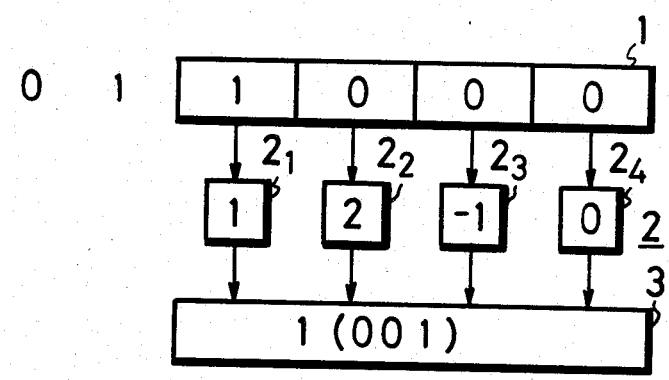
FIGS. 3A to 3F are respectively diagrams used to explain the operation of the present invention.
Figure 3B:
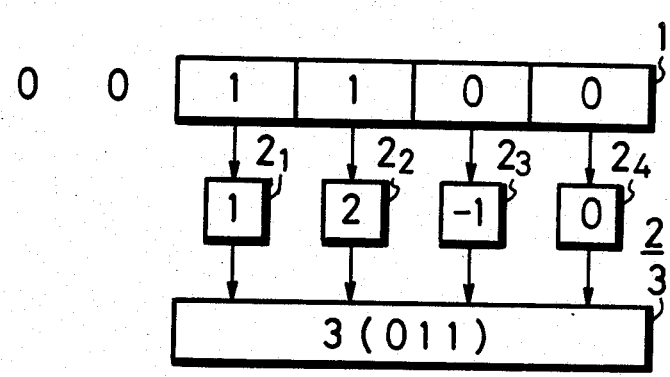
Figure 3C:
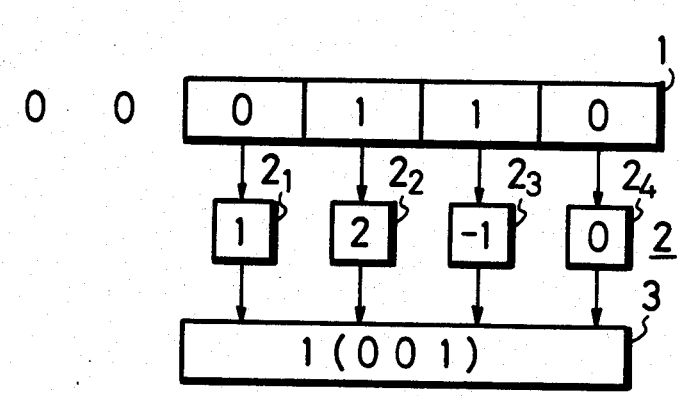
Figure 3D:
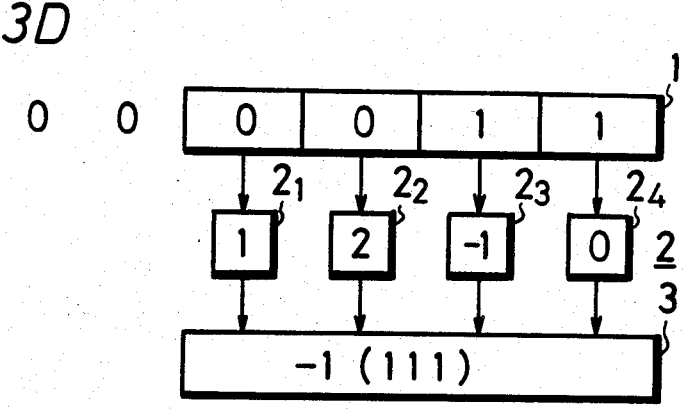
Figure 3E:
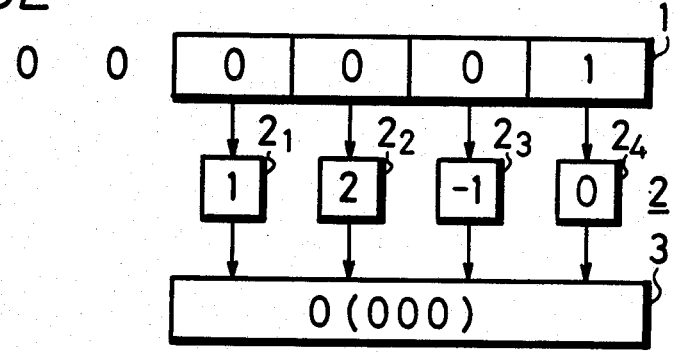
Figure 3F:
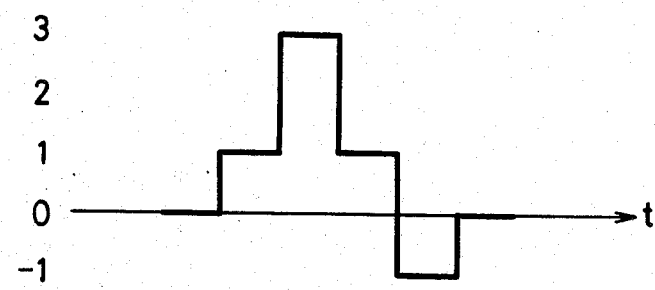

If, now, the data "1" from input terminal 5 is latched in the first bit of shift register 1, as shown in FIG. 3A, this data "1" is weighted by the coefficient multiplier 2. In elements $2_1$ to $2_4$ of coefficient multiplier 2, the weighting coefficients of, for example, 1,2,-1 and 0, are respectively set, as in the expression of the natural number, and each of these weighting coefficients is multiplied with the respective bit of the shift register. Since the multiplied results are 1,0,0 and 0 considered from the left-hand side, if these multiplied results are added to one another in adder 3 (using the 2's-complement binary code), the added result becomes 1. By the next (second) shift clock, the content of shift register 1 is changed to 1,1,0 and 0 as shown in FIG. 3B. If this data is weighted similarly as described above, the multiplied results become 1,2,0 and 0 considered from the left-hand side. If these multiplied results are added together by adder 3, the added results become 3. If the weighting and the addition are carried out similarly thereafter, the added result becomes 1 in FIG. 3C, −1 in FIG. 3D and 0 in FIG. 3E, respectively. As a result, at the output side of adder 3, there is obtained the output signal shown in FIG. 3F and which corresponds to the input data "1".

Figure 4:
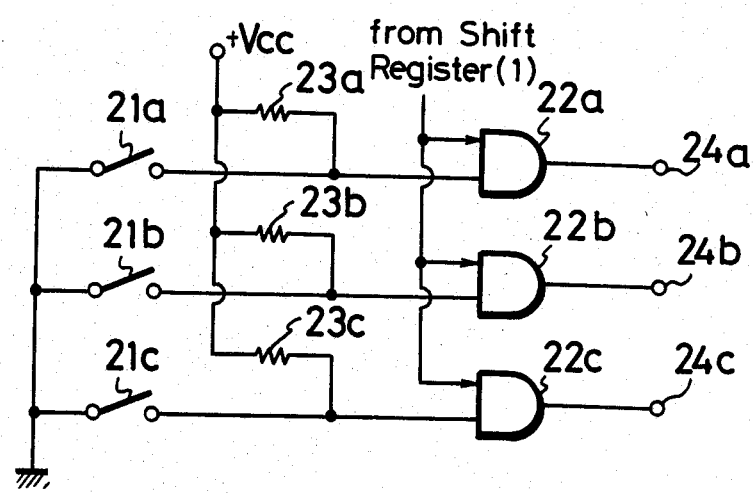
FIG. 4 is a circuit connection diagram showing an example of a coefficient multiplier included in the waveform shaping apparatus according to the present invention.

For each of the elements $2_1$ to $2_4$ of coefficient multiplier 2, there may be used, for example, the circuit arrangement shown in FIG. 4. In FIG. 4, if the bit number of the weighting coefficients is, for example, 3 bits, in correspondence with such bit number of the weighting coefficients there are provided three switches 21a,21b and 21c. These switches 21a to 21c are connected in common at one side to a predetermined potential, such as, ground, while the other sides thereof are respectively connected to first input terminals of AND gate circuits 22a,22b and 22c and, through resistors 23a,23b and 23c, respectively, to a positive voltage source terminal +Vcc. The other or second input terminals of AND gate circuits 22a to 22c are connected in common to the respective bit of shift register 1 (not shown in FIG. 4). The outputs of AND gate circuits 22a,22b and 22c are led out to output terminals 24a,24b and 24c, respectively. The output terminals 24a to 24c are connected to the input side of adder 3 (not shown in FIG. 4).

Considering the case of weighting element $2_2$, and assuming that the weighting coefficient thereof is 2 (FIGS. 3A–3E), or "010" in 2's-complement binary code, it will be seen that such coefficient is achieved when switches 21a and 21c are turned on, while switch 21b is turned off. Accordingly, the levels at the first input terminals of AND gate circuits 22a,22b and 22c become "0","1" and "0", respectively. Under these circumstances, when the data of level "1" is supplied from the respective bit of shift register 1 to the other or second input terminals of AND gate circuits 22a,22b and 22c, only AND gate circuit 22b opens its gate, while AND gate circuits 22a and 22c remain closed. As a result, at output terminals 24a,24b and 24c, there are produced data of levels, "0","1" and "0", or data added with the weighting coefficient "2".

Considering now weighting element $2_3$ which has a weighting coefficient of −1 presented as "111" by the 2's-complement binary code expression, it will be seen that, for this coefficient, switches 21a to 21c are all turned off so that, in accordance therewith, the levels at the first input terminals of AND gate circuits 22a,22b and 22c become "1","1" and "1", respectively. Under these circumstances, when the data of level "1" is supplied to the second input terminals of AND gate circuits 22a,22b and 22c from shift register 1, AND gate circuits 22a to 22c are all opened. As a result, at the output terminals 24a,24b and 24c, there are produced the data having the levels of "1","1" and "1", or the data added with the weighting coefficient "−1".

In other words, coefficient multiplier 2 supplies to adder 3 the data added with the positive or negative weighting coefficient with respect to the input data "1". The adder 3 carries out the 2's-complement binary code addition and supplies the added result to binary code converter 4. In such circuit arrangement, problems may arise as to the effective availability of the dynamic range in adder 3, and as to whether or not the given word length is utilized as effectively as possible.

Figures 5, 7:
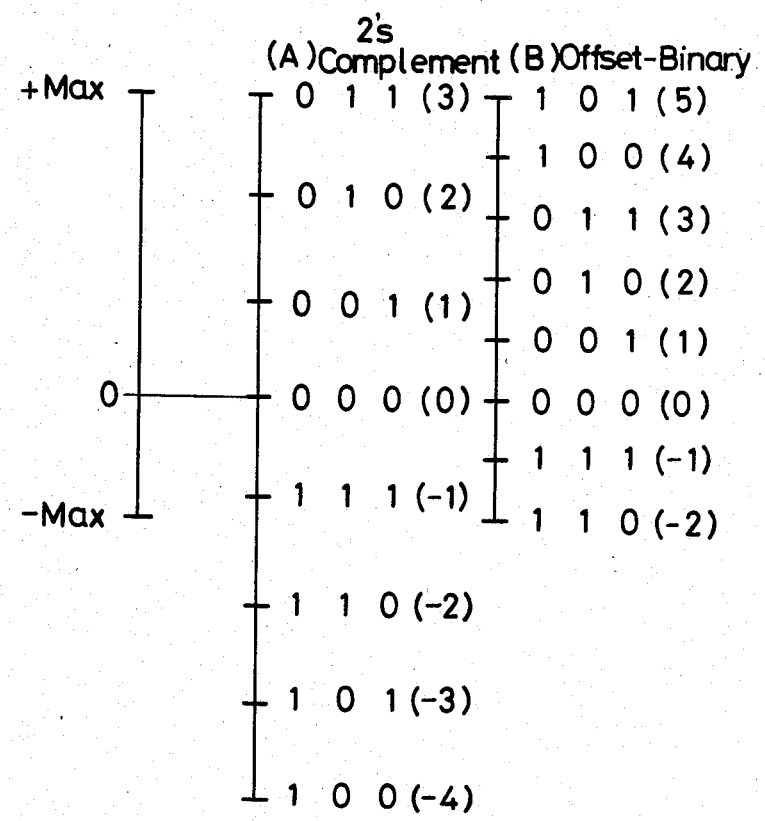

The 2's-complement binary code is defined as shown in the table of FIG. 5 in the case of 3 bits. In such case, in respect to the 0 level, three levels are expressed at the positive side and four levels are expressed at the negative side.

Figure 6:
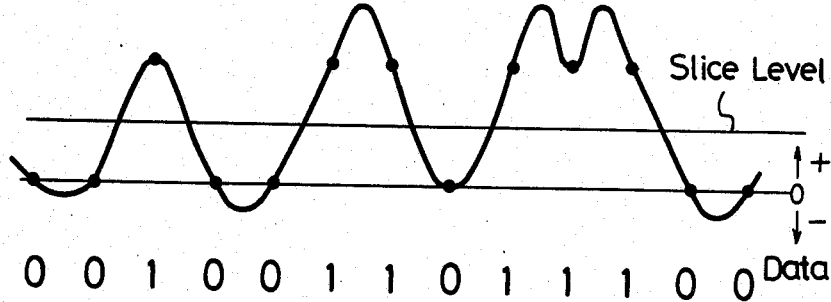
FIG. 6 is a waveform diagram showing an output waveform of a D/A (digital-to-analog) converter included in the system of FIG. 2.

However, if waveform shaping is carried out by the waveform shaping circuit of FIG. 1, the added result is largely displaced to the positive side, while the large level at the negative side does not appear so that the available word length is not utilized effectively. In other words, if the word length is not limited, the added result is largely displaced to the positive side, for example, as shown on FIG. 6.

Accordingly, in order to carry out such addition precisely within the limitations of the limited word length, the waveform shaping apparatus must be arranged so that the addition can be carried out by a normal adder similarly to the 2's-complement binary code and a binary code whose dynamic range is wide at the positive side must be defined. To this end, it is sufficient that the normal 2's-complement binary code be offset and defined.

For example, as shown in FIG. 7, if the least significant two levels "101" (−3) and "100" (−4) at the negative side of the normal 2's-complement binary code shown in column (A) are shifted to the most significant positive side and defined as "101" (5) and "100" (4), as shown in column (B), the resulting binary code defined between the positive maximum value and the negative minimum value, has a fine quantization step and the accuracy can be improved. Further, addition can be carried out in the form of the normal 2's-complement binary code.

The positive and negative displacements of the added results become different dependent on the roll-off rate, the characteristic of distortion to be equalized and so on. Accordingly, when the binary code is defined, the weighting coefficient, which is calculated with the assumption that there is no word length limitation, is set first. The amount of the displacement is checked by carrying out the adding simulation by using a calculator and then the offset level is determined such that the ability of the given word length can be demonstrated as much as possible. Then, the weighting coefficient expressed by the defined binary code is determined. The offset binary code defined here is effective only for this particular waveform shaping circuit so that, when the latter is connected to, for example, the D/A converter 12, such offset binary code must be first converted to the binary code which is defined by the D/A converter 12. This conversion is carried out by the binary code converter 4.

For example, if as shown in FIG. 8, "010" (2) is added to the offset binary code for addition (corresponding to column (B) of FIG. 7), such offset binary code is converted to the natural binary code. On the other hand, when "110" (−2) is added to the offset binary code of column (B) in FIG. 7, such binary code is converted to the 2's-complement binary code. More specifically, comparing the offset binary code shown in the left-hand table of FIG. 8 with the natural binary code shown in the right-hand table in FIG. 8, it will be seen that the defined or offset binary code is equal to the binary code which is offset by −2 from the natural binary code. Therefore, when such defined or offset binary code is converted to the natural binary code, +2 is added thereto so as to restore it to the original binary code as mentioned above. Further, when the ordinary 2's-complement binary code in column (A) of FIG. 7 is defined as the 2's-complement binary code in column (B) of FIG. 7, such ordinary or normal binary code is offset by +2. Accordingly, when such offset 2's-complement binary code is to be converted to the normal 2's-complement binary code, such offset binary code is returned to the original binary code by adding −2 thereto.

A numerical value other than 2 can be used for offsetting the binary code. For example, when the 2's-complement binary code in column (B) of FIG. 7 is defined from the normal 2's-complement binary code in column (A), if "110" (−2) in column (B) is shifted to "110" (6), to thereby make "110" (6) the maximum value at the positive side and to make "111" (−1) the minimum value at the negative side, as shown in the table at the left-hand side of FIG. 9. Such further offset binary code is converted to the natural binary code or the 2's-complement binary code as follows: In the case of conversion to the natural binary code, since that offset or adding binary code is offset by −1 in respect to the natural binary code, it is returned to the natural or normal binary code by offsetting it by +1 ("001"). In the case of returning to the 2's-complement binary code, it is offset by +3 so that it is returned to the normal 2's-complement binary code by offsetting it −3 ("101"), as shown in FIG. 9.

Figure 10:
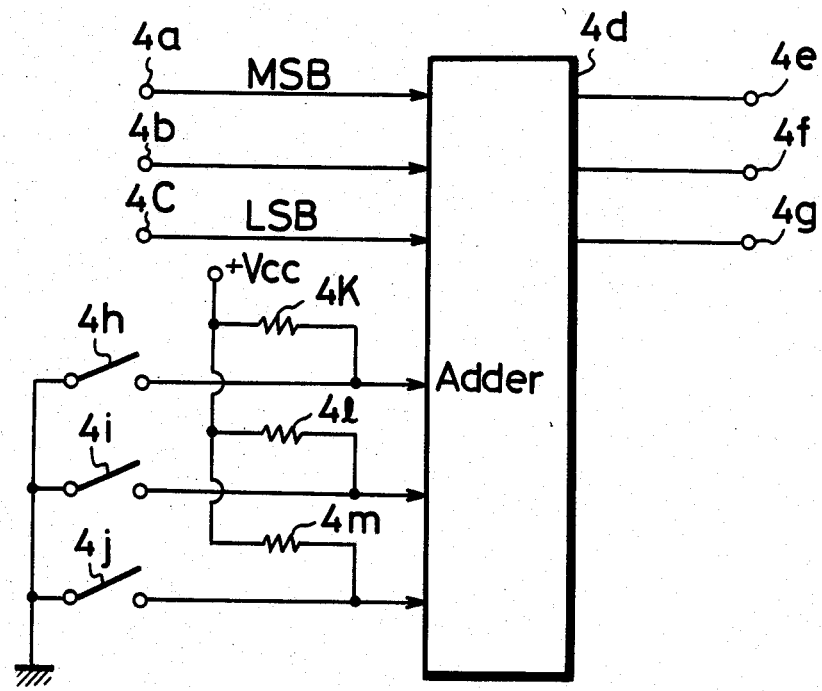
FIG. 10 is a circuit connection diagram showing an example of a code converter included in the waveform shaping apparatus according to the present invention.

Referring now to FIG. 10, it will be seen that the binary code converter 4 of FIG. 1 may have input terminals 4a,4b and 4c through which the outputs (three bits) from adder 3 are supplied to an adder 4d having output terminals 4e, 4f and 4g at which the converted binary codes are developed. In accordance with the number of bits to be added in the conversion, switches of a predetermined number, for example, three switches 4h,4i and 4j are provided. These switches 4h to 4j are connected in common at one side to the ground, while the other sides thereof are connected to respective inputs of adder 4d and, through resistors 4k, 4l, and 4m, respectively, to a positive power source terminal +Vcc.

When a conversion, for example, as shown in FIG. 8, is carried out, in order to reconvert the offset binary code for addition to the natural binary code, the switches 4h and 4j are turned on but the switch 4i is turned off so that the data of level "010" is supplied to adder 4d in which it is added to the 3 bits from input terminals 4a to 4c in the binary code manner. Similarly, in order to reconvert the offset binary code for addition to the normal 2's-complement binary code, the switches 4h and 4i are turned off but the switch 4j is turned on so that the data of level "110" is supplied to adder 4d in which it is added to the 3 bits from input terminals 4a to 4c.

When the conversion shown in FIG. 9 is carried out, in order to reconvert the offset binary code for addition to the natural binary code, switches 4h and 4i are turned on but switch 4j is turned off so that the data of level "001" is supplied to adder 4d in which it is added with the 3 bits from input terminals 4a to 4c in the binary code manner. Similarly, in order to reconvert the offset binary code for addition, as shown on the left side of FIG. 9, to the normal 2's-complement binary code switches 4h and 4j are turned off but switch 4i is turned on so that the data of level "101" is supplied to the adder 4d in which it is added with the 3 bits from input terminals 4a to 4c.

As set forth above, in accordance with the present invention, the weighted coefficients are selected so that the offset binary code is defined and calculated for utilizing the given word length as much as possible and the added result is converted to the natural binary code or the 2's-complement binary code, so that the addition can be carried out by utilizing the given word length as effectively as possible. Accordingly, the full dynamic range can be used as effectively as possible. Thus, the precision in waveform shaping can be improved considerably. Moreover, the desired highest precision can be realized by hardware of simple circuit construction.

Furthermore, since the optimum binary code for the waveform shaping can be defined and the weighting coefficients can be easily set by such definition of the optimum binary code, the optimum waveform shaping operation for various kinds of systems can be carried out easily by the same hardware.

Although a preferred embodiment of the invention has been described above, it will be apparent that many modifications and variations could effected therein by one skilled in the art without departing from the spirit or scope of the invention which is defined by the appended claims.

We claim:

1. A waveform shaping apparatus comprising:
   a shift register having a clock input terminal, a data input terminal and a plurality of data output terminals;
   a plurality of coefficient multipliers having respective input and output terminals, said input terminals of the coefficient multipliers being connected to respective data output terminals of said shift register, each of said coefficient multipliers using a 2's-complement binary code offset within a predetermined range from a normal 2's-complement binary code;
   adder means supplied with output signals from said output terminals of said coefficient multipliers to produce a summing output; and
   code converter means receiving said summing output for converting the same to a natural binary code or a 2's-complement binary code.

2. A waveform shaping apparatus according to claim 1; in which each of said coefficient multipliers is presettable manually.

3. A waveform shaping apparatus according to claim 2; in which each of said coefficient multipliers comprises:
- a plurality of AND gate circuits each having first and second input terminals and an output terminal, each of said first input terminals being connected to a respective one of said data output terminals of said shift register and each said output terminal of an AND gate circuit being connected to the input of said adder means;
- a plurality of ON/OFF switches connected between the second input terminals of respective ones of said AND gate circuits and a reference point; and
- a biasing voltage source connected to said second input terminals.

4. A waveform shaping apparatus according to claim 2; further including a D/A (digital-to-analog) converter connected to said code converter means to produce an analog signal in response to said digital signal.

5. A waveform shaping apparatus according to claim 4; in which said analog signal is amplitude-modulated on a carrier and the amplitude-modulated signal is transmitted by a transmission line.

6. A waveform shaping apparatus according to claim 5; further comprising:
- receiving means for receiving said amplitude-modulated signal;
- detecting means for detecting said amplitude-modulated signal; and
- slicer means connected to said detecting means for demodulating said digital signal from said analog signal.

* * * * *